Patented Aug. 26, 1952

2,608,586

UNITED STATES PATENT OFFICE 2,608,586

ETHERS OF ALLYL-TYPE ALCOHOLS WITH HALOGEN - CONTAINING SUBSTITUTED CARBINOLS, AND PROCESS

Seaver A. Ballard, Orinda, Rupert C. Morris, Berkeley, and John L. Van Winkle, San Lorenzo, Calif., assignors to Shell Development Company, San Francisco, Calif., a corporation of Delaware No Drawing. Application December 13, 1948, Serial No. 65,064

12 Claims. (Cl. 260—614)

This invention relates to organic chemical compounds and to a process for the preparation of organic chemical compounds.

More particularly, the present invention relates to a new and unexpected reaction of allyl-type hydrocarbon halides with organic epoxide compounds whereby there are produced valuable unsaturated ethers of allyl-type alcohols with halogen-containing substituted carbinols that are useful in a wide variety of applications, to a process for accomplishing the reaction, and to novel and useful products prepared thereby.

The allyl-type hydrocarbon halides which are reacted with organic epoxide compounds according to the present invention are the olefinic hydrocarbon halides wherein an atom of halogen is directly linked to a saturated carbon atom and said atom of halogen is in the allyl position with respect to an olefinic carbon-to-carbon bond. Said halogen atom thus is directly attached to a saturated carbon atom which is directly linked via a univalent bond to a second carbon atom which in turn is directly linked via an olefinic, or aliphatic carbon-to-carbon double bond to a third carbon atom. The allyl-type hydrocarbon halides may also be referred to as the beta,gamma-olefinic halides, since they contain an olefinic bond in the beta,gamma position relative to the atom of halogen, and in a more limited case they may be defined as the 2-alkenyl halides. Although the alkenyl group generally will be an open-chain alkenyl group, in other cases it may be a closed-chain alkenyl group, e. g., a cycloalkenyl group.

The allyl-type hydrocarbon halides form a distinctive class of reactive unsaturated compounds which undergo reactions that clearly distinguish them from halogen-substituted hydrocarbons that do not contain a halogen atom in the allyl position relative to an olefinic bond. Unlike, for example, the saturated or the aromatic hydrocarbon halides, the allyl-type hydrocarbon halides may be polymerized readily to high molecular weight polymers. They are further distinguished by virtue of their unique chemical characteristics from other hydrocarbon halides, such as, for instance, the alkyl halides, the aryl halides, and the aralkyl halides, e. g., by their tendency to form dimeric products of condensation, a tendency that is lacking in the alkyl halides, the aryl halides and the aralkyl halides. The allyl-type hydrocarbon halides have further distinctive properties not found in other hydrocarbon halides, and in many cases they react in a manner that could not be foretold on the basis of reactions of other hydrocarbon halides.

Insofar as we are aware, the only attempt heretofore to react allyl-type hydrocarbon halides with organic epoxy compounds, e. g., alkylene oxides and substituted alkylene oxides, was by Lopatkin (Journal fur Praktische Chemie, [2] 30, 390 (1884)), who by reacting allyl iodide and epichlorhydrin in the presence of zinc at 0° C. obtained an unsaturated alcohol corresponding to one of the probable formulas $$CH_2Cl \cdot CH(OH) \cdot CH_2 \cdot CH_2 \cdot CH:CH_2$$

and

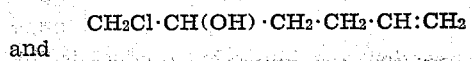

Insofar as we are aware, the product thus prepared has been of only laboratory, or theoretical interest and has not been found to possess properties which would make it of commercial value or its production on a large scale of interest to the chemical industry.

It now has been surprisingly discovered in accordance with the present invention that valuable products having a high degree of commercial utility may be prepared by reacting allyl-type hydrocarbon halides with organic epoxide compounds by heating under conditions more fully described hereinafter, at an elevated temperature of from about 100° C. to about 350° C. and in liquid phase, a mixture comprising the allyl-type hydrocarbon halide and the organic epoxide compound. The products which are produced in accordance with the process of the present invention are very different from the aforementioned product produced by the above known process. Instead of alcohols, the products produced in accordance with the present invention are valuable unsaturated ethers wherein one radical linked to the ether oxygen atom is the hydrocarbon radical of the allyl-type hydrocarbon halide reactant, and wherein the other radical linked to the ether oxygen atom is the radical of a halogen-substituted alcohol containing at least one carbon atom directly linked to the carbon atom of the carbinyl group and having a halogen atom substituted on a carbon atom which is directly linked to the carbon atom of the carbinyl group. For example, it has been discovered that by heating allyl chloride with epichlorhydrin as hereinafter described there is produced in excellent yields the valuable ether allyl bis(chloromethyl)carbinyl ether. This compound is of wide value in the commercial arts. It may be employed in the preparation of new and improved resins as hereinafter described, and it has a wide variety of other and important potential applications. In contrast to the above known reaction of allyl iodide with epichlorhydrin, the new reaction which forms the principle of the present invention enables the preparation of useful and valuable new organic compounds. The reaction, which is readily distinguishable from previous reactions known to us of allyl-type hydrocarbon halides with epoxide compounds, proceeds substantially as illustrated by the specific equation:

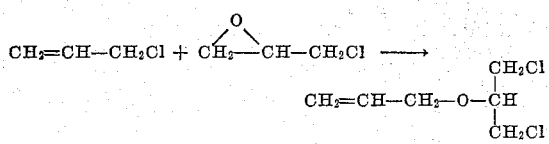

It will be seen from the equation that allyl chloride, when caused to react with epichlorhydrin according to the process of the invention combines with the latter as illustrated to produce the valuable unsaturated halogen-containing ether allyl bis(chloromethyl)carbinyl ether. Methallyl chloride and epibromohydrin, when caused to react according to the process of the invention, combine substantially as illustrated in the following equation:

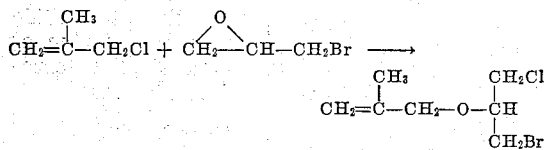

In this reaction, the illustrated product is the valuable compound methallyl chloromethylbromomethylcarbinyl ether.

A still further illustration of the reaction accomplished by the process of the invention is as follows:

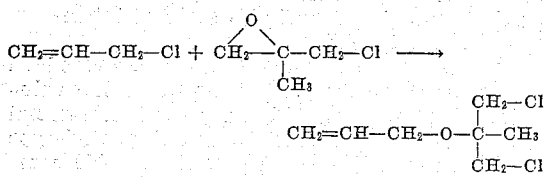

It will be observed that in the illustrated reaction, the ether linkage is at the beta carbon atom of the halogen-substituted hydrocarbon residue. That is, ethers of allyl-type alcohols with non-primary, i. e., with secondary and with tertiary halogen-substituted alcohols are produced. This was indeed a surprising result of the process. Various alcohols when suitably reacted with epoxide compounds containing a

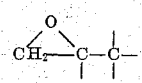

group form the ether of a primary alcohol derived from the epoxide compound, and the results described in United States Patent 2,241,200, to Hopff, indicate that reaction between even benzyl chloride and propylene oxide produces the chlorpropyl ether as contrasted to the chlorisopropyl isomer. Because ethers of allyl-type alcohols with secondary and tertiary halogen-substituted alcohols are obtainable by the process of the invention from epoxide compounds containing the group

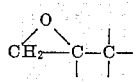

the process affords an effective method for preparing new and useful ethers, many of which could heretofore have been prepared only at considerably greater difficulty and expense, if at all.

In accordance with the generic aspects of the invention, the process of the invention may be applied to reacting any allyl-type hydrocarbon halide with any organic epoxide compound containing a 1,2- or 1,3-epoxide ring to produce ethers of allyl-type alcohols with halogen-substituted alcohols. The generic equation expressing the reaction as thus broadly applied is substantially as follows:

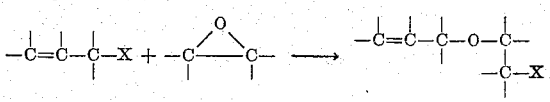

In this equation, X represents an atom of halogen, preferably bromine or chlorine; the formula

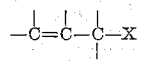

represents the allyl-type hydrocarbon halide; the formula

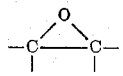

represents the organic epoxide compound; and the unsaturated halogen-containing ether produced as the product of the process is represented by the formula

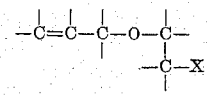

Representative compounds which contain 1,2- and/or 1,3-epoxide rings and with which allyl-type hydrocarbon halides may be reacted by heating in liquid phase according to the process of the invention include the alkylene oxides, such as ethylene oxide, propylene oxide, 1,2-epoxybutane, 2,3-epoxybutane, isobutylene oxide, 1,3-epoxybutane, butadiene monoxide, butadiene dioxide, styrene oxide, cyclopentene oxide, 1-3-epoxycyclopentane, as well as substituted alkylene oxides which contain one or more various substituent atoms or groups. Representative substituted epoxide compounds include, among others, epoxide ethers, such as glycidyl methyl ether, glycidyl ethyl ether, glycidyl propyl ether, beta-ethylglycidyl isopropyl ether, glycidyl neopentyl ether, glycidyl naphthyl ether; nitro epoxides, such as 3-nitro-1,2-epoxypropane, 3-nitro-2-ethyl-1,2-epoxybutane, and nitrostyrene oxide; epoxide esters, such as methyl 2,3-epoxypropionate, glycidyl acetate, beta-methylglycidyl isobutyrate, and glycidyl naphthenate; and sulfur-containing epoxide compounds, such as glycidyl ethyl thioether and alpha-methylglycidyl cyclohexyl thioether.

It has been further discovered according to the invention that allyl-type hydrocarbon halides may be reacted according to the process of the invention even with epoxide compounds containing a reactive group or atom in addition to the epoxide ring, particularly epoxide compounds containing a reactive halogen atom, such as the epihalohydrins and the substituted epihalohydrins, to produce, for example, valuable allyl-type ethers of dihalogen-substituted secondary and tertiary carbinols. Representative epihalohydrins which may be employed in the process of the invention include, for example, epichlorohydrin, epibromohydrin, beta-methylepichlorohydrin, alpha,alpha' - dimethylepibromohydrin, beta-methylepibromohydrin, beta-ethylepibromohydrin, cyclohexylepichlorohydrin, phenylepichlorohydrin, and 1-bromo-3,4-epoxybutane. It is not always necessary that the halogen atom in the epihalohydrin be linked to a carbon atom which in turn is directly linked to a carbon atom of the epoxy group, since allyl-type hydrocarbon halides may be successfully reacted with epihalohydrins wherein the carbon atom to which the halogen atom is attached is one or more times removed from the epoxide group. Furthermore, the process is not limited to epihalohydrins containing 1,2-epoxide groups, since allyl-type hydrocarbon halides may be reacted according to the process of the invention with epihalohydrins containing 1,3-epoxide groups as well.

While various epoxide compounds may be employed in the process of the invention, a preferred subgroup of epoxide compounds which may be employed in accordance with the invention is composed of epihalohydrins wherein the epoxide group is a 1,2-epoxide group containing in the epoxide ring a —CH₂— group and having a halogen-substituted methyl group directly linked to the other carbon atom of the epoxide ring, i. e., the glycerol epihalohydrins. The preferred epoxide compounds may be represented by the formula

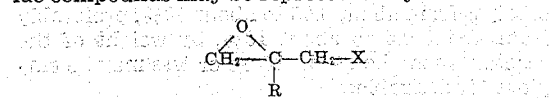

in which X represents an atom of halogen, i. e., bromine or chlorine, and R represents a hydrogen atom or hydrocarbon group, such as alkyl (examples thereof being methyl, ethyl, propyl, isopropyl, butyl, isobutyl, t-butyl, the pentyl groups, the hexyl groups, etc.), an aryl group (examples thereof being phenyl, phenethyl, xylyl, tolyl, benzyl, etc.), or a cycloaliphatic group (examples thereof being cyclopentyl, cyclohexyl, methylcyclopentyl, ethylcyclohexyl, etc.). It has been discovered that the reaction of allyl-type hydrocarbon halides with the glycerol epihalohydrins as accomplished in the process of the present invention proceeds substantially as follows:

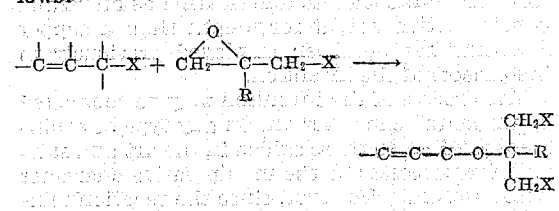

The product thus formed will be seen to contain a greater number of halogen atoms than does either of the reactants and, furthermore, to contain the halogen atoms in the activated positions characterized by attachment to a carbon atom which in turn is directly bonded to a non-primary (i. e., a secondary or tertiary) carbon atom. The high yields of these distinctive products, and absence of appreciable further condensation of these products with either of the reactants or with themselves not only were unexpected results obtained according to the process of the invention, but such results provide good evidence of the critical difference, insofar as the process of the invention is concerned, between hydrocarbon halides in which the halogen atom is in the allyl position relative to an olefinic bond and hydrocarbon halides which do not contain a halogen atom in the allyl position relative to an olefinic bond.

The invention in its broad concepts is regarded as being generic to reacting by heating in liquid phase as hereinbefore and hereinafter described any beta,gamma-olefinic hydrocarbon halide with organic epoxide compounds containing 1,2- and/or 1,3-epoxide rings to produce ethers of beta,gamma-olefinic alcohols with halogen-substituted non-primary alcohols. In the allyl-type hydrocarbon halide, the saturated carbon atom to which the halogen atom is directly linked may be a primary carbon atom (directly linked to only one carbon atom), a secondary carbon atom (directly linked to two atoms of carbon), or it even may be a tertiary carbon atom (directly linked to three atoms of carbon), although it is in general preferred to employ the primary allyl-type hydrocarbon halides. Aliphatic primary allyl-type hydrocarbon halides are particularly preferred. Allyl-type hydrocarbon halides which have been reacted with epoxide compounds according to the process of the invention have contained only the one atom of halogen. Allyl-type hydrocarbon halides containing more than the one atom of halogen also have been successfully employed in the process of the invention. If more than one atom of halogen is present in the allyl-type halide, the additional atom or atoms may be in the allyl position relative to an olefinic bond, or preferably it or they may be in a position or positions other than the allyl position relative to an olefinic bond, e. g., in vinyl position. Representative allyl-type halides, as hereinbefore and hereinafter defined, which may be employed in the process of the invention include among others the following: aliphatic allyl-type hydrocarbon primary monohalides, such as allyl chloride, allyl bromide, methallyl chloride, methallyl bromide, crotyl chloride, crotyl bromide, 2-ethyl-3-chloro-1-propene, 2-ethyl-3-bromo-1-propene, 2-isopropyl-3-chloro-1-propene, 2-n-propyl-3-bromo-1-propene, 1-chloro-2-pentene, 1-bromo-3-methyl-2-pentene, 1-chloro-2-ethyl-2-butene, 1-bromo-2-ethyl-2-butene, 1-chloro-2-butyl-2-butene, 1-bromo-2-isobutyl-2-butene, 1-chloro-2-pentyl-2-pentene, 1-chloro-2-butyl-3-methyl-2-butene, 1-bromo-2-methyl-2-octene, 3-chloro-2-neopentyl-1-propene, 3-bromo-2-hexyl-1-propene, 1-chloro-2-ethyl-3-methyl-2-butene, 1-bromo-2-ethyl-3-methyl-2-butene, 1-chloro-2-tetradecene and 1-chloro-2-hexyl-2-pentene; aliphatic allyl-type hydrocarbon secondary monohalides, such as 3-chloro-1-butene, 3-bromo-1-butene, 3-chloro-1-pentene, 3-bromo-1-pentene, 3-chloro-1-hexene, 4-chloro-2-hexene, 4-chloro-5-methyl-2-hexene, and 5-chloro-3-heptene. Still other allyl-type hydrocarbon halides which may be reacted according to the process of the invention with organic epoxide compounds includes the following: 3-chloro-1-cyclohexene, 3-bromo-1-cyclohexene, 1,4-dichloro-2-butene, 1,4-dibromo-2-pentene, cinnamyl chloride, cinnamyl bromide, 3-chloro-2-phenyl-1-propene, 3-bromo-2-phenyl-1-propene, 1-chloro-2,4-pentadiene, allylidene chloride, and 5-methyl-3-chlorocyclohexene.

While the generic invention applies broadly to use in the process of any allyl-type hydrocarbon halide, a preferred embodiment of the invention is limited to the aliphatic beta-methylene hydrocarbon primary monohalides, such as allyl chloride, allyl bromide, methallyl chloride, methallyl bromide, 3-chloro-2-ethyl-1-propene, 3-bromo-2-isopropyl-1-propene and homologs and analogs thereof. This preferred group, which is distinguished on the one hand by the great reactivity of the olefinic bond, the tendency of the members to polymerize, and on the other hand by the desirable properties of the products obtained therefrom according to the invention, may be described by means of the formula

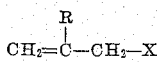
$$CH_2=\underset{R}{C}-CH_2-X$$

in which X is an atom of halogen, i. e., bromine or chlorine, and R is a hydrogen atom or a monovalent aliphatic hydrocarbon group, such as an alkyl group.

The process of the present invention may be carried out by heating at a suitable elevated temperature and for a suitable time a mixture of the selected reactants and after the desired reaction has proceeded to a substantial extent recovering from the resulting mixture the product formed by the reaction. Since the reaction occurs in liquid phase, the reaction mixture should be kept partially or wholly in liquid phase during the heating operation. The temperature that is employed will depend to a limited extent upon the particular reactants involved as well as upon the other reaction conditions, e. g., time, proportions of reactants, etc. It has been found that, if the temperature is too low, the desired reaction does not occur, while at excessively high temperatures polymerization, decomposition, and/or undesired side reactions predominate and inadequate yields of the desired product are obtained. The lowest temperature generally suitable is about 100° C., and temperatures of at least 130° C. are preferred. While in some instances temperatures as high as 350° C. may be employed, preferred temperatures, because of the optimum yields of the desired products resulting therefrom, are below 250° C.

The allyl-type hydrocarbon halide and the epoxide compound preferably are employed in amounts corresponding to approximately equimolar proportions of the two reactants. It has been discovered that a moderate excess of the epoxide compound relative to the allyl-type hydrocarbon halide has a beneficial effect upon the rate of reaction and therefore favors higher conversions to product other conditions being equal. Generally speaking, amounts of the two reactants corresponding to mole ratios of olefinic halide: epoxide compound from about 10:1 to about 1:10 may be used, a preferred range, because of the optimum conversions to desired product and the more efficient operations provided, being mole ratios from about 2:1 to about 1:2. Although the presence of an inert solvent ordinarily will not be required, suitable inert solvents may be included in the reaction mixture, as when one of the reactants is a gas, or a solid at the reaction temperature, and it would be convenient to handle such reactant in the form of a solution rather than in the pure state.

The reaction proceeds in the absence of added catalysts, although higher reaction rates and hence shorter reaction periods may be obtained by conducting the process in the presence of a suitable catalyst for the reaction. Because of the polymerizable character of the organic compounds involved in the process, the catalyst should be one that does not tend to cause excessive polymerization of reactants and/or product but which nevertheless favors the desired reaction without favoring undesired side reactions. Small amounts of copper, or of copper compounds, especially cuprous salts, when contacted with the reaction mixture, increase the reaction rate markedly. Surprisingly, they do so without noticeably favoring formation of polymers; hence higher conversions to the desired products may be obtained, other conditions being equal, by conducting the process in the presence of copper or a copper salt than in the absence of catalysts. Among the copper compounds which may be employed are the halides of copper, including the bromides, the chlorides, and the iodide, copper sulfate, copper nitrate, copper borate, azurite, cuprous carbonate, etc., as well as organic salts of copper, e. g., copper acetate, copper naphthenate, copper zenzoate, copper palmitate, copper salicylate, etc., and complexes of copper, e. g., cuprous chloride-tributyl phosphite complex. Cuupric bromide is a particularly efficacious and a preferred catalyst.

The catalyst may be added as such to the reaction mixture, or in other cases it may be carried upon or in a solid supporting material, such as diatomaceous earth, alumina, silicon carbide, carbon, sintered glass, etc., and the reaction mixture intimately contacted, while heating, with the supported catalyst. When a copper salt, such as a copper halide, is employed as the catalyst, the amount of the catalyst conveniently may be in excess, that is, an amount such that solid catalyst is present during the reaction. Amounts of the catalyst from about 0.05 to about 50%, preferably from about 0.5 to about 10%, by weight of the reactants may be used. More or less may be employed if desirable.

An especially effective catalyst has been found to be the solid material remaining as a residue from a cycle of the process conducted in the presence of an excess of a solid copper salt. This will be illustrated in one of the examples. Thus, in an original cycle the mixture may be heated in contact with copper metal. A part of the copper reacts forming a solid residue. Or a copper salt as such, for example, a copper halide, may be employed as the catalyst. At the conclusion of the heating, the solid remaining is allowed to settle out, and the liquid is removed for recovery of the reaction product. The solid residue remaining, when employed as the catalyst in a succeeding cycle, carried out by adding fresh reactants thereto and heating as aforesaid, is more active weight for weight than a copper salt that has not been employed previously in the process of the invention.

The process of the invention may be conducted in any suitable manner and in any type of equipment familiar to those skilled in the art and suitable for processes of the manipulative character here involved. However, since the reaction mixtures are corrosive to certain metals, the equipment should be constructed of or lined with a suitable corrosion resistant material. Glass, porcelain; nickel, gold, tantalum, molybdenum, iridium, palladium, chromium, platinum, cadmium, or suitable alloys thereof; rubber, synthetic organic chemically-resistant surface coatings, and the like, are included among suitable materials of which at least the surface of the equipment exposed to contact with the reaction mixture may be constructed or lined. Certain ferrous materials of construction are less desirable. Thus, it has been found that the presence of iron, as in pure state or as in the various carbon steels, in contact with the reaction mixture under the reaction conditions of the process favors the formation of polymers and tars apparently derived from the allyl-type hydrocarbon halide and surprisingly, conversion of the epoxide compound, for example in the case of epichlorohydrin, to glycerol dichlorohydrin. It has been discovered that the undesired action of iron may be minimized or prevented by the presence of upwards of from about 5% by weight of nickel alloyed therewith, with or without other alloying elements, and that, accordingly, stainless steels or ferrous alloys containing at least 5% of nickel may be used with advantage as materials of construction for equipment to be employed in the execution of the process of the invention. Suitable stainless steels include, for example, nickel-chromium steels such as AISI Types Nos. 304, 316, 309, 311, 301, and 325 (see "Metals and Alloys Data Book," by S. L. Hoyt, Reinhold Publishing Corporation, New York, 1943).

The process may be carried out in a batchwise, intermittent, or continuous manner. A suitable batchwise procedure is to prepare a mixture of the reactants, which may or may not have been preheated, and to add the catalyst if one is to be employed. The mixture may be heated in a suitable corrosion-resistant vessel, such as one equipped with condensing means, such as a reflux condenser, in the case of reactants boiling at or near the reaction temperature, or in a closed autoclave in the case of reactants which boil at temperatures below the reaction temperatures to be employed. With reactants which are immiscible with each other and/or with the catalyst, it has been found to be desirable to agitate the reaction mixture during the heating by means of a suitable agitating device to provide intimate contact between the reactants or the reactants and the catalyst. The course of the reaction may be followed by withdrawing samples from the reaction mixture and subjecting them to analysis. In continuous operations, streams of the reactants, which may have been preheated, may be mixed and the mixture held at the desired temperature for a suitable time. The catalyst, if one is employed, may be added to either or both of the reactants prior to their admixture, or it may be added to the mixture of reactants. Also, the catalyst, for example, a supported catalyst, may be positioned in a reaction zone and the reaction mixture passed into contact therewith under suitable conditions of temperature and time. The pressure upon the reaction mixture may be either at, below, or above the atmospheric pressure, subject to the requirement for maintaining the mixture in liquid phase. If superatmospheric pressures are employed, they may be autogenous, as developed upon heating of the reaction mixture in a closed vessel, or they may be applied, as by the application of mechanical pressure or an inert gas (e. g., argon, nitrogen, methane, helium, etc.) under pressure, to the reaction mixture.

After the reaction has proceeded to the desired extent, the product may be recovered from the reaction mixture by any suitable procedure. The catalyst, if a solid suspended in or dispersed throughout the mixture may be removed by filtration, sedimentation, centrifugation or like operations, and may be employed, with the advantage hereinbefore pointed out, in a further cycle of the process. The desired product may be recovered from the reaction mixture by fractional distillation, by treatment with selective solvents, by crystallization, or other applicable methods, fractional distillation generally being preferred. Unreacted allyl-type hydrocarbon and/or epoxide compound may be recovered and recycled in whole or in part through the process.

The following examples are given not as limitations upon the invention but for the purpose of indicating more clearly the principles upon which the invention is based and to present specific examples of the invention and the advantages thereof:

Example I

Into a pressure-resistant cylindrical glass vessel having an internal diameter of about 1½ inches and a length of about 10 inches there was introduced a mixture of 93 grams (1.1 mole) of epichlorhydrin (1-chloro-2,3-epoxypropane) and 84 grams (1.1 mole) of allyl chloride. In the mixture there was suspended 5 grams of copper foil 0.002 inch thick. The vessel was closed with a stopper mechanically held in place to withstand internal pressures developed in the vessel, and the vessel and its contents were heated by immersion in a heated oil bath at 180° C. to 185° C. for 15 hours. The vessel then was withdrawn from the oil bath, cooled and solid suspended in the liquid allowed to settle. The copper foil had reacted and a non-metallic solid remained. The liquid was decanted from the solid and fractionally distilled. The fraction distilling at 104° C. under 45 millimeters mercury pressure was collected separately and found to be allyl bis(chloromethyl)carbinyl ether, having the structure

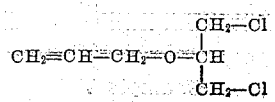

Further properties of the product thus prepared were found to be as follows: refractive index ($n_D^{20}$) 1.4672; density ($d_4^{20}$) 1.166. Analyses: found, 41.8% Cl, 42.4% C, and 5.95% H; calculated for $C_6H_{10}OCl_2$, 41.98% Cl, 41.85% C, and 5.92% H. The conversion of reactants employed to the allyl bis(chloromethyl)carbinyl ether was 62.9% based on the epichlorohydrin and 57.1% based on the allyl chloride. The yield of allyl bis(chloromethyl)carbinyl ether was 70.5% based on the epichlorohydrin consumed and 90.0% based on the allyl chloride consumed.

Example II

This example illustrates a cyclic process utilizing a catalyst previously used for effecting the reaction between an allyl-type hydrocarbon halide and an epoxide compound. As the catalyst, there was employed the moist solid residue or sludge remaining in the glass vessel after the decantation step in the preceding example. To the residue there was added a further 93 grams of epichlorohydrin and 84 grams of allyl chloride. The vessel was closed and heated at 160° C. to 163° C. for 15 hours. After cooling, the liquid portion of the mixture was separated and distilled. Conversion to allyl bis(chloromethyl)carbinyl ether was found to be 42% based on the amount of epichlorohydrin employed.

Since in this experiment, the temperature was not comparable with the temperature employed in the previous example, a further experiment was conducted in the manner employed in Example I, but at a reaction temperature of 165° C. to 172° C. The allyl bis(chloromethyl)carbinyl ether was recovered in a conversion of 27% based upon the amount of epichlorohydrin consumed, demonstrating the marked superiority of the catalyst employed in the first experiment described under this example.

Example III

In a glass-lined autoclave, there were mixed 552 grams (5.97 moles) of epichlorohydrin and 502 grams (6.56 moles) of allyl chloride. A piece of copper foil 0.002 inch thick and 34 square inches in area was added. The autoclave was closed and heated at 147° C. to 166° C. for 66 hours. Upon fractional distillation of the resulting mixture, allyl bis(chloromethyl) carbinyl ether was recovered in conversions of 70% and 63.6%, respectively, based upon the amount of epichlorohydrin and allyl chloride employed, and in yields of 77.5% and 82.6%, respectively, based upon the amount of epichlorohydrin and allyl chloride consumed.

Example IV

To a mixture of 93 grams of epichlorohydrin and 84 grams of allyl chloride in the vessel used in Example I there was added 0.3 gram of copper ethyl diacetoacetate. The mixture was heated at 165° C. to 169° C. for 15 hours and then fractionally distilled. Allyl bis(chloromethyl) carbinyl ether was recovered in the following amounts by fractional distillation of the resulting mixture:

|  | Conversion, percent on Reactant Employed | Yield, percent on Reactant Consumed |
|---|---|---|
| Allyl chloride | 22.5 | 90 |
| Epichlorohydrin | 24.8 | 65.7 |

Example V

In the absence of added catalyst, and in a glass-lined autoclave, allyl chloride and epichlorohydrin present in 1.1:1 mole ratio reacted in 15 hours at 164° C. to 170° C. to form allyl bis(chloromethyl)-carbinyl ether in conversions of 6.5% and 5.8%, respectively, based upon the epichlorohydrin and the allyl chloride employed. As in the previous experiments, polymer formation was negligible.

Example VI

A mixture of 103 grams epichlorohydrin, 97 grams allyl chloride and 28 grams of cuprous chloride was heated in a nickel autoclave for 25 hours at 162° C. to 166° C. The autoclave then was cooled, the contents withdrawn and the liquid, after separation from the catalyst, distilled. Conversion of allyl chloride employed to allyl bis(chlormethyl)carbinyl ether was found to be 47.5% and conversion of epichlorohydrin to product was found to be 54.4%.

Example VII

A mixture of 279 grams of epichlorohydrin, 252 grams of allyl chloride and 6 grams of cuprous chloride was placed in a stainless steel autoclave provided with an efficient stirrer, and heated with agitation at 148° C. to 154° C. for 18¼ hours. During this time, the pressure (autogenous) dropped from its original value of 130 pounds per square inch to a final value of 40 pounds per square inch. The allyl bis(chloromethyl) carbinyl ether was recovered in the following yields and conversions:

|  | Conversion, percent on Reactant Employed | Yield, percent on Reactant Consumed |
|---|---|---|
| Allyl chloride | 53.8 | 86.7 |
| Epichlorohydrin | 59.2 | 87.1 |

As a demonstration of the desirability of providing intimate contact between the solid catalyst and the liquid reaction mixture, when the foregoing experiment was repeated without agitation of the reaction mixture during the heating period, the conversion to allyl bis(chloromethyl) carbinyl ether was about 8% based on the epichlorohydrin employed. The results thus obtained suggest that the mechanism of the catalysis is in large measure one of heterogeneous catalysis rather than homogeneous catalysis by copper compounds dissolved in the liquid mixture.

Example VIII

In a glass reaction vessel similar to the one employed in Example I there were mixed 64 grams (1.1 mole) of propylene oxide, 92 grams (1.2 mole) of allyl chloride, and 2 grams of cuprous chloride. The mixture was heated in the closed vessel at 165° C. to 169° C. for 15 hours. The cooled liquid then was decanted from the residual solids in the vessel and fractionally distilled. The product, which was found to have a boiling point of 64–65° C. under a pressure of 50 millimeters of mercury, was identified as allyl 1-chloro-2-propyl ether having the formula

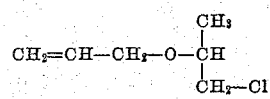

The product was recovered in a conversion of 71% based on the propylene oxide employed and 66% based on the allyl chloride employed.

Example IX

In a similar manner, allyl chloride and glycidyl allyl ether were caused to react to produce the diallyl ether of glycerol alphamonochlorohydrin. By heating in a closed glass vessel at 165° C. for 15 hours a mixture of 91 grams (0.8 mole) of allyl chloride, 68 grams (0.89 mole) of glycidyl allyl ether and 2 grams of cuprous chloride, and fractionally distilling the resulting mixture there was obtained in 87% yield on the allyl chloride consumed and in 65% conversion on the glycidyl allyl ether employed the indicated product distilling at from 126.5 to 128.5° C. under a pressure of 50 millimeters of mercury. The product was found to have a refractive index ($n_D^{20}$) of 1.4570 and a specific gravity ($d_4^{20}$) of 1.0357.

Example X

This example illustrates the reaction of an allyl-type hydrocarbon halide containing two halogen atoms, one being in the allyl position with respect to the olefinic bond and the other in the vinyl position, with an epoxide compound. In a glass vessel similar to the one employed in Example I there were mixed 111 grams (1.0 mole) of 1,3-dichloropropene, 83 grams (0.9 mole) of epichlorohydrin, and 2 grams of cuprous chloride. By heating the mixture in the closed vessel at 165° C. to 170° C. for 15 hours and fractionally distilling the liquid mixture produced, 3-chloroallyl bis(chloromethyl)-carbinyl ether was obtained in a 31% conversion of epichlorohydrin to product and a 27.5% conversion of 1,3-dichloropropene to product. The 3-chloroallyl bis(chlromethyl) carbinyl ether thus prepared distilled at 125° C. to 127° C. under 20 millimeters mercury pressure and was found to have a refractive index ($n_D^{20}$) of 1.4930 and a specific gravity ($d_4^{20}$) of 1.3048. Upon analysis, the product was found to contain 51.9% Cl, 4.5%

H and 35.2% C, compared to values of 52.3% Cl, 4.4% H, and 35.4% C calculated for the formula

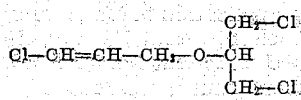

Example XI

Methallyl chloride and epichlorohydrin when heated together according to the method illustrated in the preceding examples, in the presence of cuprous chloride and at 165° C. to 170° C. for 15 hours, formed methallyl bis(chloromethyl)carbinyl ether, distilling at 116° C. to 117° C. under a pressure of 50 millimeters of mercury. Upon analysis, the product was found to contain 38.0% Cl, 6.67% H and 46.9% C, compared to values of 38.8% Cl, 6.55% H, and 45.9% C calculated for the formula

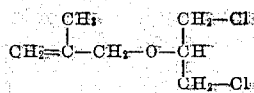

The process of the present invention has enabled for the first time reacting by addition allyl-type hydrocarbon halides containing a reactive olefinic bond with organic epoxide compounds containing an activated and labile halogen atom substituted on a carbon atom directly linked to a carbon atom of the epoxide ring, without attendant modification of said olefinic bond and without affecting said labile halogen atom. Many of the compounds which thus may be prepared by the process of the invention are new and could not have been prepared in a practicable manner, if at all, by methods heretofore known. Of special interest as valuable products are the ethers of beta,gamma-olefinic alcohols with bis(halomethyl)carbinols, which ethers may also be represented by the formula $$R-O-\underset{R''}{\underset{|}{\overset{R''}{\overset{|}{C}}}}-R'$$

wherein R—O— represents the oxy residue of a beta,gamma-olefinic alcohol and in which R represents a hydrocarbon group or a halosubstituted hydrocarbon group (examples of such beta,gamma-olefinic alcohols being allyl, methallyl, 2-ethyl-2-propenyl, crotyl, cinnamyl, 2-cyclohexenyl, 4-chloro-2-butenyl, 3-chloro-2-octenyl, 3-chloroallyl, 3-bromoallyl, 3-chloro-2-methylallyl, 2-pentenyl, tert.-pentenyl, 2-phenyl-2-propenyl, 3-(1-pentenyl) and 2-ethyl-3-methyl-2-butenyl, and like alcohols), R' represents a hydrogen atom or a hydrocarbon group, such as an alkyl group (e. g., methyl, ethyl, propyl, butyl, pentyl, octyl, decyl, tetradecyl, etc.), an aryl group (e. g., phenyl, naphthyl, benzyl, phenethyl, etc.), or a cycloalkyl group (examples thereof being cyclopentyl and cyclohexyl), and each R'' represents a halomethyl group represented by —CH$_2$X wherein X represents a halogen atom, i. e., bromine or chlorine, and in which halomethyl groups the respective halogen atoms may be the same or dissimilar. The compounds according to the foregoing formula may be prepared according to the process of the invention by reacting as herein disclosed suitable allyl-type hydrocarbon halides with glycerol epichlorhydrins of the general formula

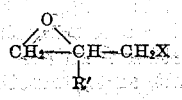

in which R' and X are as defined immediately above. A subgroup of compounds which may be prepared according to the invention comprises the allyl-type ethers of beta-methylene aliphatic alcohols with aliphatic bis(halomethyl)carbinols, which ethers may also be represented by the formula

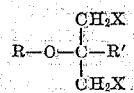

in which R represents a beta-methylene aliphatic hydrocarbon group (i. e., a 2-methylene aliphatic hydrocarbon group, such as allyl, methallyl, 1-ethyl-2-propenyl and homologous and analogous groups having a methylene group, CH$_2$=, directly linked to the carbon atom in the No. 2, or beta, position), R' represents a hydrogen atom or an alkyl group, and X represents bromine or chlorine, preferably chlorine.

When the allyl-type hydrocarbon halide employed in the process of the invention contains two or more halogen atoms, there may be obtained according to the process of the invention new and useful ethers of halo-substituted allyl-type alcohols with bis(halomethyl)-substituted carbinols. A valuable subgroup of novel compounds which thus may be prepared is represented by the formula

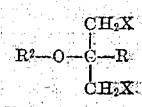

in which R$^2$ is a 3-halo-2-alkenyl group (examples thereof being 3-chloroallyl, 3-chloro-2-isopropylallyl, 3-bromo-1-dodecylallyl, 3-chloro-2-butenyl, 3-chloro-1-propyl-2-hexenyl, and 3-bromo-2-isopropyl-butenyl), R is the hydrogen atom, and X is chlorine or bromine.

Of especial interest and value, not only because of the availability of the raw materials required for their preparation, but also because of their distinctive and desirable properties, are the allyl-type ethers of the beta-methylene primary aliphatic alcohols with aliphatic bis(halomethyl) carbinols, which ethers may be represented as an important subgroup of compounds obtainable according to the invention, by the formula

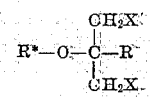

in which R is a hydrogen atom or an alkyl group, X is chlorine or bromine, preferably chlorine, and R* is the hydrocarbon radical of a beta-methylene beta, gamma-olefinic primary alcohol, i. e., of a primary 2-methylenealkanol. A more limited subgroup of valuable compounds which may be prepared according to the process of the invention comprises those represented by the immediately preceding formula when the hydrocarbon group represented by R* is the hydrocarbon group of allyl alcohol, or the 2-propenyl group. Illustrative compounds of this subgroup include the allyl ethers of bis(halomethyl) substituted carbinols, such as the following: allyl bis(chloromethyl)carbinyl ether, allyl bis-(bromoethyl)carbinyl ether, allyl ethyl-bis(chloromethyl)carbinyl ether, allyl methyl-bis(bromo-methyl)carbinyl ether, allyl propyl-bis(chloromethyl)carbinyl ether, allyl butylbromomethylcarbinyl ether, allyl neopentyl-bis(chloromethyl)carbinyl ether, allyl hexyl-bis(bromomethyl)carbinyl ether, allyl isooctyl-bis(chloromethyl)carbinyl ether and allyl decyl-bis(chloromethyl)carbinyl ether.

Another subgroup of compounds which are of especial interest, because of the distinctive branched-chain structure of the hydrocarbon radical directly linked to the ether oxygen atom, comprises those ethers represented by the immediately preceding structural formula when R* is the hydrocarbon radical of a beta-methylene beta,gamma-olefinic aliphatic primary alcohol containing a tertiary olefinic carbon atom in the beta-position. This group may be represented by the formula

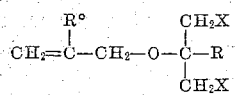

in which R represents the hydrogen atom or an alkyl group and X represents chlorine or bromine, and R° is an alkyl group, such as an alkyl group containing from one to ten carbon atoms. Illustrative compounds within this preferred subgroup which may be prepared according to the process of the invention include among others the following: methallyl bis(chloromethyl)carbinyl ether, methallyl bis(bromomethyl)-carbinyl ether, methallyl methyl-bis(chloromethyl)carbinyl ether, 2-ethyl-2-propenyl bis-(chloromethyl)carbinyl ether, 2-ethyl-2-propenyl butyl - bis(chloromethyl)carbinyl ether, methallyl pentylchloromethylbromomethylcarbinyl ether, 2-butyl-2-propenyl octyl-bis(chloromethyl)carbinyl ether, 2-neopentyl-2-propenyl decyl-bis(chloromethyl)carbinyl ether, 2-octyl-2 - propenyl t - butyl - bis(bromomethyl) carbinyl ether, methallyl 1,3-dimethylbutyl-bis(chloromethyl)carbinyl ether, as well as their various homologs and analogs having structures defined by the formula.

The compounds illustrated above possess properties which distinguish them from heretofore known compounds and which render them of improved value for various applications. The presence of two halomethyl groups (in which each halogen is linked to a primary carbon atom) substituted on the carbon atom that is directly linked to the ether oxygen atom imparts desirable properties to the compounds not found in ethers of halogen-substituted carbinols in which there is present only one halogen atom, or, if two halogen atoms are present, one is linked to a primary carbon atom and another is linked to a secondary or a tertiary carbon atom. The presence of the beta,gamma-olefinic bond in the hydrocarbon radical linked to the ether oxygen atom also contributes unique properties to the novel compounds, which properties are not found in ethers of halogen-substituted carbinols formed by substituting for the hydroxyl hydrogen atom of said carbinols, for example, an alkyl group, an aryl group, or a cycloalkyl group.

The compounds obtainable by the process of the invention possess wide utility. They are valuable as versatile chemical intermediates. For example, the halogen atoms may be replaced by hydroxyl as by hydrolysis, and valuable allyl-type monethers of trihydric alcohols, e. g., of glycerol, may be prepared. Allyl-type beta-ethers of glycerol thus obtainable may be employed for the preparation of improved alkyd resins according to the invention disclosed and claimed in U. S. Patent to Theodore W. Evans and David E. Adelson, No. 2,448,258, August 31, 1948. Such glycerol ethers may also be polymerized by the action of oxygen at a suitable elevated temperature as disclosed and claimed in the pending application of Hans Dannenberg and David E. Adelson, Serial No. 470, filed January 3, 1948, now U. S. Patent No. 2,545,689, or suitable glycerol ethers thus prepared may be reacted with monobasic carboxylic acids to obtain valuable polymerizable esters. The ethers of beta,-gamma-olefinic alcohols with bis(halomethyl) carbinols, particularly the ethers of 2-methylene aliphatic primary alcohols with saturated aliphatic bis(chloromethyl)-substituted carbinols, are also useful as intermediates for the preparation of sulfur-containing high molecular weight products by condensation with water-soluble sulfides and polysulfides, such as alkali metal sulfides and polysulfides, and ammonium or alkaline earth metal sulfides and polysulfides. Ethylenic polymers of the novel ethers of the invention may also be prepared by application of known methods for the polymerization of polymerizable vinyl compounds. Products obtainable by the process of the present invention also are of interest and may be used as biologically active compounds and as precoursers of biologically active compounds, and in a wide variety of other applications.

We claim as our invention:

1. Allyl bis(chloromethyl)carbinyl ether.

2. Methallyl bis(chloromethyl)carbinyl ether.

3. 3 - Chloroallyl bis(chloromethyl)carbinyl ether.

4. An ether wherein one radical linked to the ether oxygen atom is a hydrocarbon radical of a beta-methylene aliphatic primary alcohol and the other radical linked to the ether oxygen atom is the di-chloro-substituted hydrocarbon radical of an aliphatic bis(chloromethyl) carbinol.

5. An ether of a beta,gamma-olefinic alcohol with a carbinol having two halomethyl groups directly linked to the carbon atom of the carbinyl group.

6. A process which comprises heating a mixture of about equimolar amounts of allyl chloride and epichlorhydrin in contact with copper at about 180° C. to 185° C. for about 15 hours, and recovering the allyl ether of bis(chloromethyl) carbinol from the resulting mixture.

7. A process which consists in reacting a beta,-gamma-olefinic hydrocarbon halide with an epoxide compound at a temperature within the range of from about 100° C. to about 350° C. to produce an ether of a beta,gamma-olefinic alcohol with a halomethyl-substituted carbinol.

8. A process which consists in reacting allyl chloride with epichlorohydrin at a temperature within the range of from about 100° C. to about 350° C. to produce allyl bis(chloromethyl)carbinyl ether.

9. A process which consists in reacting in liquid phase a 2-methylene primary aliphatic hydrocarbon halide with a glycerol epihalohydrin in the presence of a copper salt to produce an ether of a bis(halomethyl) carbinol with a beta-methylene primary aliphatic alcohol.

10. A cyclic process for the preparation of allyl bis(chloromethyl)carbinyl ether which comprises heating in liquid state a mixture of allyl chloride and epichlorohydrin present in mole ratios from about 10:1 to about 1:10 at about 130° C. to about 250° C. in contact with an excess of a copper salt whereby there is produced an amount of said allyl bis(chloromethyl)carbinyl ether, substantially separating the liquid mixture containing said ether from the remaining excess of said copper salt, and contacting a fresh mixture of allyl chloride and epichlorohydrin with the remaining excess of said copper salt and heating the mixture in liquid phase while in contact with the remaining excess of said copper salt at about 130° C. to about 250° C. to produce a further quantity of the allyl bis(chloromethyl)-carbinyl ether.

11. A process which comprises heating allyl chloride and epichlorohydrin together in the presence of a cupreous catalyst at a temperature within the range of from about 100° C. to about 350° C. and recovering alyl bis(chloromethyl)-carbinyl ether from the resulting mixture.

12. A process which comprises heating a beta,-gamma-olefinic hydrocarbon halide and a glycerol epihalohydrin together in the presence of a cupreous catalyst at a temperature within the range of from about 100° C. to about 350° C. and recovering an ether of a bis(halomethyl) carbinol with a beta,gamma-olefinic alcohol from the resulting mixture.

SEAVER A. BALLARD.
RUPERT C. MORRIS.
JOHN L. VAN WINKLE.

REFERENCES CITED

The following references are of record in the file of this patent:

UNITED STATES PATENTS

| Number | Name | Date |
|---|---|---|
| 2,236,919 | Raynhart | Apr. 1, 1941 |
| 2,241,421 | Price | May 13, 1941 |
| 2,363,614 | Patrick | Nov. 28, 1944 |
| 2,437,866 | Vance et al. | Mar. 16, 1948 |
| 2,462,602 | Botteron | Feb. 22, 1949 |
| 2,464,747 | Grosser | Mar. 15, 1949 |
| 2,541,091 | Oroshnik | Feb. 13, 1951 |